US008443367B1

(12) United States Patent  
Taylor et al.

(10) Patent No.: US 8,443,367 B1  
(45) Date of Patent: May 14, 2013

(54) FEDERATED MANAGEMENT IN A DISTRIBUTED ENVIRONMENT

(75) Inventors: Frank Taylor, Barnet (GB); David Simons, Welwyn Garden (GB); Anthony Wilkinson, Aylosbury (GB)

(73) Assignee: VMware, Inc., Palo Alto, CA (US)

( * ) Notice: Subject to any disclaimer, the term of this patent is extended or adjusted under 35 U.S.C. 154(b) by 383 days.

(21) Appl. No.: 12/838,100

(22) Filed: Jul. 16, 2010

(51) Int. Cl.  
*G06F 9/46* (2006.01)

(52) U.S. Cl.  
USPC ............................... 718/102; 718/1; 718/100

(58) Field of Classification Search .................. None  
See application file for complete search history.

(56) References Cited

U.S. PATENT DOCUMENTS

| 7,320,085 | B2 | 1/2008 | Bain | |
|---|---|---|---|---|
| 8,141,075 | B1* | 3/2012 | Chawla et al. | 718/1 |
| 2006/0074940 | A1* | 4/2006 | Craft et al. | 707/100 |
| 2006/0195715 | A1* | 8/2006 | Herington | 714/4 |
| 2008/0120616 | A1* | 5/2008 | James et al. | 718/100 |
| 2008/0189468 | A1* | 8/2008 | Schmidt et al. | 711/6 |
| 2008/0189700 | A1* | 8/2008 | Schmidt et al. | 718/1 |
| 2008/0320121 | A1* | 12/2008 | Altaf et al. | 709/224 |
| 2009/0049172 | A1* | 2/2009 | Miller et al. | 709/225 |
| 2009/0204966 | A1* | 8/2009 | Johnson et al. | 718/100 |
| 2010/0070978 | A1* | 3/2010 | Chawla et al. | 718/105 |
| 2010/0131654 | A1* | 5/2010 | Malakapalli et al. | 709/227 |
| 2010/0153946 | A1* | 6/2010 | Bhaskar et al. | 718/1 |
| 2010/0153955 | A1* | 6/2010 | Sirota et al. | 718/102 |
| 2010/0269027 | A1* | 10/2010 | Arimilli et al. | 714/799 |
| 2010/0299495 | A1* | 11/2010 | Frank | 711/170 |
| 2010/0306560 | A1* | 12/2010 | Bozek et al. | 713/320 |
| 2011/0099403 | A1* | 4/2011 | Miyata et al. | 713/323 |

OTHER PUBLICATIONS

VMware, "Introduction to virtual Desktop Manager" Revision 20080527, (pdf: VMware_2008.pdf; pp. 1-32).*  
Buyya et al. "Special section: Federated resource management in grid and cloud computing systems", Jun. 15, 2010, Elsevier, (NPL_Buyya.pdf, pp. 1-3).*  
Murphy et al. "Distributed Management of Virtual Cluster Infrastructures", 2009 IEEE, Clemson University, (NPL_Murphy.pdf, pp. 1-8).*

* cited by examiner

*Primary Examiner* — Emerson Puente  
*Assistant Examiner* — Hiren Patel

(57) ABSTRACT

Methods, systems, and techniques that enable enhanced coordination and management of a plurality of servers cooperatively operating in a cluster of servers. In one implementation, a plurality of enhanced Virtual Desktop Management (VDM) Servers operating in a Federated Virtual Desktop Management (VDM) Cluster are provided. Each of the enhanced VDM Servers active in the Federated VDM Cluster use federated task information pertaining to and derived from various executing federated tasks. However, only a single selected one of the plurality of enhanced VDM Servers is executing a particular one of the federated tasks at a time so that each federated task is continuously running somewhere in the Federated VDM Cluster.

36 Claims, 8 Drawing Sheets

FEDERATED MANAGEMENT IN A DISTRIBUTED ENVIRONMENT

BACKGROUND

The benefits of computer virtualization have been recognized as greatly increasing the computational efficiency and flexibility of a computing hardware platform. For example, computer virtualization allows multiple virtual computing machines (VMs, or "guests") to run on a common computing hardware platform (referred to as a "host"), even when the software components, such as the guest operating systems of each virtual machine, differ. Similar to a physical computing hardware platform, virtual computing machines include storage media, such as virtual hard disks, virtual processors, guest physical memory, virtual devices, and other system components associated with a computing environment. In a typical virtualized machine architecture, a virtual hard disk stores a guest operating system, data, and application files for a virtual machine. Virtualization software receives disk read and write requests from guest software running on the virtual machine and maps the requests to a disk image file containing an image of the virtual disk on a data store accessible by the host. The disk image file is block-based, and contains file segments that map to disk blocks of the virtual disk. Thus, when the virtual machine reads a particular disk block, that request is mapped to a read of the corresponding segment of the disk image file, the contents of which are supplied to the virtual machine in a manner consistent with an ordinary disk read.

Server-based computing, such as available using computer virtualization architectures, allows a networked client computing system, remotely situated with respect to a server computing system, to access computing resources on the server. For example, a client computing system can use a remote desktop protocol such as Remote Desktop Protocol (RDP) Virtual Network Computing (VNC), or PCoIP to access a desktop remotely. A virtual desktop is a virtual computing system that operates as a desktop or workstation computer that an end user can interact with using the remote desktop protocol and client software and/or hardware. The client software and/or hardware transmits user input, such as keyboard and/or mouse input, to the remote computing system to be processed there, and receives display and other data, such as sound, for presentation to the user.

Server-based computing facilities may be used to centralize management of computing resources. However, one drawback is that a single host can only support a limited number of VMs. Thus, as the number of VMs increases, additional hosts are required. Various schemes have been devised to facilitate coordinated management of a large number of hosts. For example, one or more management servers may manage a large number of VMs and the networked clients that are using the VMs. These management servers also manage operation of the large number of hosts that provide the VMs.

To manage connectivity between the VMs and the networked clients, each management server performs a variety of management tasks. Further, the management servers coordinate with each other by sharing information about the particular hosts and networked clients that they are actively managing. To facilitate operation of the management servers in a coordinated manner, the management servers may be arranged in a cluster format so that they are configured to operate as a group of linked servers working together closely so that, in many respects, they form a single server.

When the number of management servers operating in a management server cluster is relatively small, coordination problems between the management servers are manageable. However, as the demand for more VMs increases, the number of management servers in the management server cluster must also increase to support the additional hosts required to provide the increased demand in VMs. That is, the size of an existing management server cluster is scaled up to accommodate an increasing number of users because only so many users, hosts, and the like can be supported by a single management server due to computing resource demands placed on an individual management server. At some point, the management server cluster becomes so large and complex that coordination problems arise between the management servers.

Further, the management servers within the management server cluster are likely performing many of the same tasks that are being performed by other management servers. Thus, when viewed from the management server cluster level, computational inefficiencies arise due to task duplication at the management servers.

And, as the management servers in a relatively large and complex management server cluster are attempting to coordinate their management activities with each other, collisions can arise when two or more management servers are trying to simultaneously use the resources of the management server cluster, such as executing operations on the same entities. Such collisions hinder coordinated operation of the management servers.

DETAILED DESCRIPTION

Figure 1:
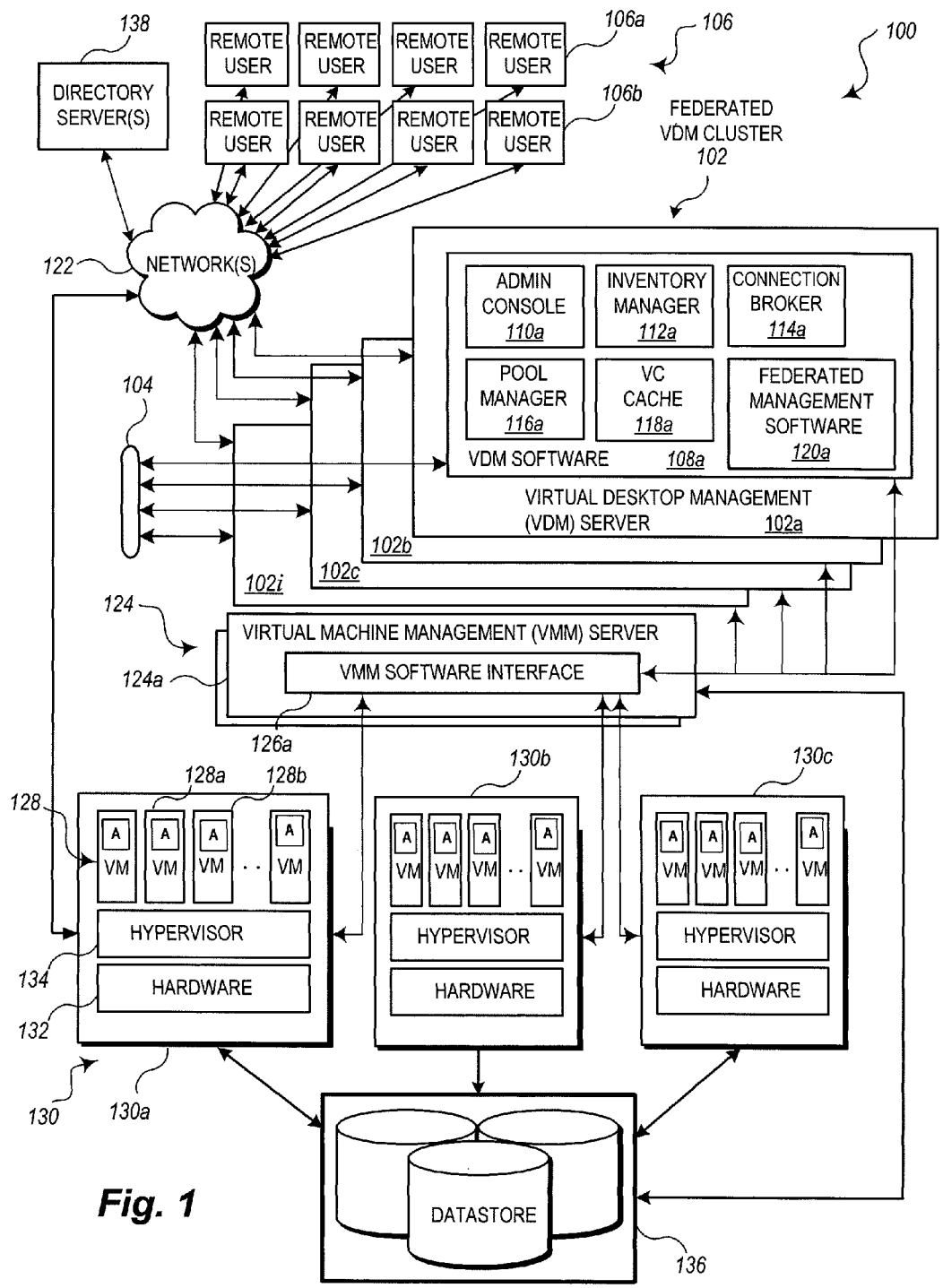
FIG. 1 is an example block diagram of an example general virtualized machine architecture environment for executing an example Federated Virtual Desktop Management (VDM) Cluster comprised of a plurality of enhanced Virtual Desktop Management (VDM) Servers.

Embodiments described herein provide enhanced computer-based and network-based methods, systems, and techniques for providing access to content stored remotely, for example, as part of a virtual machine (VM) infrastructure or elsewhere in a networked environment, using a mechanism that automatically scales the environment to provide coordination and efficiency as additional VM infrastructure is added to support more virtual machines as user demand increases. Example embodiments provide enhanced Virtual Desktop Management (VDM) Servers which include federated management software to coordinate and manage the plurality of enhanced VDM Servers operating in a Federated Virtual Desktop Management (VDM) Cluster. In the context of the present disclosure, "federation" means an organization of nodes (software entities, such as the example enhanced VDM Servers) wherein each node of the federation may release management operations (such as a federated task) to another node or entity of the organization of nodes, which then runs the management operations on behalf of all nodes or entities. Using the federated management software, the enhanced VDM Servers automatically allocate and balance management tasks between the federated nodes in a manner that additional nodes can be added to the infrastructure while it is in operation without causing additional overhead. Using the federated management software, information can be automatically shared between the federated nodes, for example, without locking up precious infrastructure resources.

Although federated management software is described herein with respect to VDM servers in a VDM Cluster, federated management software may be useful in a variety of other contexts. For example, federated management software may be used in other servers within a virtualization infrastructure. In some cases, the federated management software may also be useful outside of a virtualization environment, such as to control a plurality of computers, printers, and/or other electronic devices acting in cooperation with each other. Other embodiments and/or applications are also contemplated.

Typically, when a plurality of enhanced VDM Servers are operating in a Federated VDM Cluster, a variety of types of tasks are performed by each of the enhanced VDM Servers. For example, an enhanced VDM Server may execute a local task to facilitate its own operations. From time to time, an enhanced VDM Server may also execute a persistent task, which is a task, for example, one initiated by a user or an administrator, that is continuously executed to completion. In addition, an enhanced VDM Server may execute a federated task, which is a task that is coordinated across the Federated VDM Cluster by software executing on the active enhanced VDM Servers participating in the Cluster. These different types of tasks may be executing on a particular enhanced VDM Server at the same time.

To facilitate coordinated management between the plurality of enhanced VDM Servers, each of the active enhanced VDM Servers use state information pertaining to and derived from the various executing federated tasks. However, only a single selected one of the plurality of enhanced VDM Servers may be executing a particular one of the federated tasks. That is, only one instance of that particular federated task is executing on one of the active enhanced VDM Servers at a time so that the federated task is continuously running somewhere in the Federated VDM Cluster.

Each of the enhanced VDM Servers includes federated management software to enable operation in a federated manner. In at least one embodiment, the federated management software comprises a tracker manager component and a task framework component. The tracker manager component of the federated management software maintains replicated tracker data at each of the enhanced VDM Servers. For example, the tracker manager component stores the task state data and distributes the task state data to other enhanced VDM Servers. The same replicated tracker data may be maintained at each of the enhanced VDM Servers. For instance, as one of the enhanced VDM Servers is executing a particular one of the federated tasks, its respective tracker manager component communicates pertinent federated task state information to the other enhanced VDM Servers. The tracker manager components of the other active enhanced VDM Servers, upon receipt of federated task state information, update their respective replicated tracker data with the received federated task state information.

A task framework component of the federated management software facilitates coordination of the federated tasks among the enhanced VDM Servers. For example, if one of the active enhanced VDM Servers leaves the Federated VDM Cluster, the leaving enhanced VDM Server winds down any executing federated task so that quiesced federated task state information may be communicated to all of the remaining enhanced VDM Servers. The task framework components of the remaining enhanced VDM Servers act cooperatively so that the federated task begins execution on another one of the remaining enhanced VDM Servers. As another example, if one of the active enhanced VDM Servers unexpectedly interrupts so that execution of the federated task is interrupted, then the task framework component in at least one of the remaining enhanced VDM Servers recognizes that execution of the federated task has been interrupted. Then, the task framework components of the remaining enhanced VDM Servers act cooperatively so that one of the remaining enhanced VDM Servers may be identified to initiate execution of the federated task based on information in the replicated tracker data. As yet another example, when a newly active enhanced VDM Server joins the Federated VDM Cluster, the task framework component in each of the enhanced VDM Servers recognizes that the new enhanced VDM Server has joined the Federated VDM Cluster. Then, the task framework components of the active enhanced VDM Servers act cooperatively so that one or more of the federated tasks may be identified for execution by the new enhanced VDM Server. Execution of the federated task(s) by the new enhanced VDM Server may be based on information in its replicated tracker data that has been received from another one of the enhanced VDM Servers.

FIG. 1 is an example block diagram of an example general virtualized machine architecture environment for executing an example Federated Virtual Desktop Management (VDM) Cluster 102 comprised of a plurality of enhanced Virtual Desktop Management (VDM) Servers 102a-102i. The example general virtualized machine architecture environment may be generally referred to as a Virtualization Center 100. The plurality of enhanced VDM Servers 102a-102i are communicatively coupled with each other via a communication bus 104. In an example embodiment, the communication bus may be external to the enhanced VDM Servers 102a-102i. Other embodiments may have the enhanced VDM Servers 102a-102i communicatively coupled via other communication devices (not shown), and/or the communication bus 104 may optionally provide communications between other devices (not shown). In the various embodiments, the communication bus 104 may be implemented as software, for example using Java Messaging Service (JMS), as firmware, or as a combination of software and firmware In overview, the Virtualization Center 100 employs a Federated Virtual Desktop Management (VDM) Cluster 102 comprised of a plurality of enhanced VDM Servers 102a-102i. In an exemplary embodiment, each of the enhanced VDM Servers 102a-102i may be a physical general purpose computer system having VDM server software running thereon, or may be a virtual machine executing VDM software thereon. For example, software executing on the enhanced VDM Server 102a comprises the VDM Software 108a. In an example embodiment, the VDM software 108a comprises an Administrative Console 110a, an Inventory Manager 112a, a Connection Broker 114a, a Pool Manager 116a, a Virtualization Center (VC) Cache 118a, and Federated Management Software 120a (interchangeably referred to herein as a Federated Management Software component). Other software (not shown) may be included in the enhanced VDM Server 102a, for example, as part of the VDM Software 108a or elsewhere.

As described in greater detail hereinbelow, the Federated Management Software 120 enables the plurality of enhanced VDM Servers 102a-102i to cooperatively operate with each other so that the Virtualization Center 100 efficiently provides one or more Virtual Machines (VMs) to many different users 106. For example, users 106a and 106b may access centrally-managed user desktops, such as those implemented by virtual machines running in the Virtualization Center 100, using network 122 (e.g., a local area network, or other private or publically accessible wide area network, such as the Internet) through any number of different types of devices. These VMs are complete computation environments, containing virtual equivalents of the hardware and system software components of a physical system as described above, and are typically implemented by an extensive virtualization infrastructure, which includes a variety of software and hardware components.

Remote access to virtualized desktops may be generally provided to client devices through one of the Virtual Desktop Management (VDM) Servers 102a-102i. The term "desktop" refers to a human interface environment through which the remote user 106 can launch, interact with, and manage applications, settings, and/or data, etc. Virtualized desktops may export user interfaces, e.g., keyboard and mouse input, audio and visual output, to the user from virtual machines running remotely (in the datacenter) or locally on the client, or, in some cases, using a hybrid. In the case of virtualization environments, the client side of the "desktop" typically includes a bitmap representation of the desktop running—wherever it is being run. Input to and output from the virtualized desktop are reflected in the bitmap representation on the client as it occurs on the virtualized desktop.

Each of the enhanced VDM Servers 102a-102i provide "virtual desktops" to the remote user devices, and manage the corresponding virtual machines through communication with one or more exemplary Virtual Machine Management (VMM) Servers (e.g., VMM server 124a) executing a VMM software interface 126a. Each example Virtual Machine Management Server 124a is responsible for provisioning and maintaining the multitude of VMs 128 implemented across potentially a multitude of physical computers 130, such as computers 130a, 130b, and 130c. For example, when a remote user 106a wishes to access an existing VM 128a, the remote user 106a establishes a connection through one of the enhanced VDM Servers 102a-102i, and a virtual desktop is presented (as a user interface) on the user's client device, through which communications are made with the underlying VM 128a.

In an example embodiment as shown, as implemented for example, by VMware Inc.'s virtualization infrastructure architecture, generally denoted as the Virtualization Center 100, each physical computer (for example the computers 130a, 130b and 130c) contains the underlying hardware 132, virtualization software (here shown as hypervisor 134), and one or more virtual machines, for example VM 128a and VM 128b, which each contain Agent Software (guest system software) labeled here as "A" in each VM box. The Agent Software is typically responsible for connecting each VM 128 to a selected one of the enhanced VDM Servers 102a-102i, and manages each desktop connection. The Virtual Machine Management Server 124 managing that particular VM 128 notifies a respective one of the enhanced VDM Servers 102a-102i upon each login, logoff, and disconnect with a particular remote user 106. The Agent Software also provides support for remote devices such as USB devices, etc.

Each of the Virtual Machine Management Servers 124 are configured to manage pools of compute resources used to run VMs 128 on a set of clusters typically containing multiple servers with CPUs, memory, and communications hardware (network). A virtual computer (a virtual machine or VM), when active, consumes physical compute resources and may be managed by a hypervisor layer, such as hypervisor 134 running on the physical computer 130. The hypervisor 134 manages physical resources as well as maintains virtual-to-physical hardware mappings. While some example Virtual Machine Management Servers 124 specialize in virtual machine management, such as VMware's vCenter™, Microsoft's® Virtual Machine Manager™, Citrix's Xen-Center™, other Virtual Machine Management Servers 124 can manage both physical and virtual computers, such as IBM's® Director, HP's® OpenView and Microsoft's® System Center Suite™.

The VMM Software Interface running on the Virtual Machine Management Server 124 (e.g., VMM Software Interface 126a running on the Virtual Machine Management Server 124a) communicates with these hypervisors (e.g., hypervisor 134) to provision and manage each VM 128. For example, according to traditional virtualization techniques, when a remote user (e.g., user 106a) requests access to a particular existing desktop, a enhanced VDM Server 102a (through its software 108a), communicates with a Virtual Machine Management Server 124a through its software interface 126a to start a corresponding VM 128a executing on a physical computer 130a, and to relay the user interface exported by the VM 128a to the remote user 106a so that the remote user 106a can interact with the desktop. In some instances (e.g., according to administrator policies), when the desktop is exited, or otherwise shutdown, the enhanced VDM Server 102a communicates with the Virtual Machine Management Server 124a to save the VM image to the data store 136, for example a data repository, as appropriate and to de-allocate physical and VM system resources as needed.

In general, each of the Virtual Machine Management Servers 124 provide the interfaces (such as the VMM software interface 126a) to enable other programs, such as a Pool Manager 116a, to control the lifecycle of the various VMs 128 that run on a hypervisor 134. For example, the Virtual Machine Management Servers 124 may support operations for:

1) the discovery of compute, storage, and network resources;
2) creation of logical compute pools by providing features such as automatic CPU and memory load balancing;
3) provisioning/creation of one or more virtual disks, on local or shared storage—clones with full or sparse disks;
4) creation of virtual machines anchored to a base virtual machine—for example, linked clones using REDO disks; and
5) power operations on virtual machines (power on, power-off, suspend, resume, checkpoint, etc), etc.

A Connection Broker component (e.g., Connection Broker 114a) presents to a remote user 106, one or more VMs 128 to which the remote user 106 has access privileges. Since the user has access privileges to the presented VMs 128, the user through a client device, may select a type of virtualized desktop and initiate a desktop session or access an existing connection to a virtualized desktop. Alternatively, or additionally, the user may be assigned a VM 128 from a pool of available VMs 128. An Inventory Manager component (e.g., Inventory Manager 112a) maintains a mapping of different user belongings in the system. For example, the remote user 106 may be entitled to certain applications, may have access to more than one desktop, etc. The Inventory Manager (e.g., Inventory Manager 112a) also keeps track of the running virtual desktops in the system. The mappings may be stored using any number of mechanisms, including using one or more directory servers 138 accessible through the network 122.

In one embodiment, the Pool Manager component (e.g., Pool manager 116a) may manage the complete lifecycle of virtual desktops. Desktops in a pool may be grouped together based on similar software requirements. Desktop Administrators create logical desktops groups (desktop pools) that are provisioned typically from the same base image, including the Agent Software. For example, a desktop pool may include VMs 128 that run the same set of software applications and run the same operating system. As yet another example, a desktop pool may contain a set of cloned VMs 128 that are identical in every aspect but are customized to include unique identity that includes for example, a unique computer name, IP/MAC Address, Domain membership, Software license serial numbers, OS specific security identifiers among other things. The base image may be a unique VM 128 or a template VM 128 created and/or managed by the Virtual Machine Management Server 124.

An Administrative Console component (e.g., Administrative Console 110a) typically provides a user interface for a Desktop Administrator to manage the configuration of desktop pools, define user access policies, manage ongoing maintenance, software installed in the desktops, etc. For example, the Administrative Console 110a may permit the Desktop Administrator to: create desktop pools; associate desktop pools with a Virtual Machine Management Server 124a; provide other details such as the compute resources (hosts, clusters) needed to run the VMs 128, logical resource pools (e.g., VI DRS Resource Pools) for load balancing, type of memory sharing configuration (e.g., reserve memory for virtual machines or use memory overcommit); provide storage used to provision the VMs 128 (identifying one or more datastores 136); provide guest customization details like a custom naming scheme for VMs 128 in the pool (e.g., a "marketingxxxx" custom name such that the VMs 128 in the pool are called marketing0001 to marketing9999); provide domain membership information, etc.; associate a desktop pool with a master image or template; define VM state policies (keep the VMs 128 powered-on, suspend the particular one of the VMs 128 when user 106 logs off, etc.); set up custom messages to be sent to remote end users 106 when the desktops are put into maintenance mode (e.g., for weekly patches, hotfixes, etc.); and/or manage the application registration and load process.

A Directory Server 138 stores the persistent state required for managing the virtual desktops. For example, the VMs 128 in a desktop pool maybe associated with one or more particular users 106. The user identifiers for a pool may be stored in the Directory Server 138. The users 106 may also be referenced through an external directory server such as Microsoft® Active Directory™, Novell® eDirectory, IBM® Tivoli Directory Server, etc. In an example embodiment, the Directory Server 138 may contain state information for:

1) Desktop Pools: details like the display name of the pool, e.g.,—marketing desktops, the number of desktops required in the pool, default power state of the pool (powered-on, suspended, configured to transition to low power states like ACPI S1/WoL, powered-off, etc), pool creation date, etc.;
2) Disk type for a virtual machine—full disk, sparse datastores for each desktop pool, etc.;
3) Disk replication using REDO disk approach, linked clone or synchronized clone, etc.;
4) Type of virtual disk to be stored on data store—user data disk, OS disk, guest page file, vmkernel swap file, etc.;
5) Details of virtual machines created in the pools—unique computer name, identifier and inventory location in VMMS, unique reference identifier on VMMS, etc.;
6) Users: unique identifier for user accounts, external references to Active Directory Server, Novell® eDirectory, etc.;
7) Entitlements: mappings between users, applications, and desktops;
8) Policies—indications of types of devices available, default monitor configurations (single, dual), screen resolution, etc.; and
9) Audit events—for example, lock out if three successive login attempts fail, time of access, type of access device, etc.

Examples and details of variants of virtualization architectures, such as that described with reference to FIG. 1, can be found in U.S. patent application Ser. No. 11/395,012, entitled Virtualized Desktop Allocation System Using Virtual Infrastructure, filed Mar. 31, 2006; U.S. patent application Ser. No. 12/058,269, entitled Synchronized Clones, filed Mar. 28, 2008; and in U.S. Patent Publication No. 2009/0216975, entitled Extending Server-Based Desktop Virtual Machine Architecture to Client Machines, filed Feb. 23, 2009.

Figure 2:
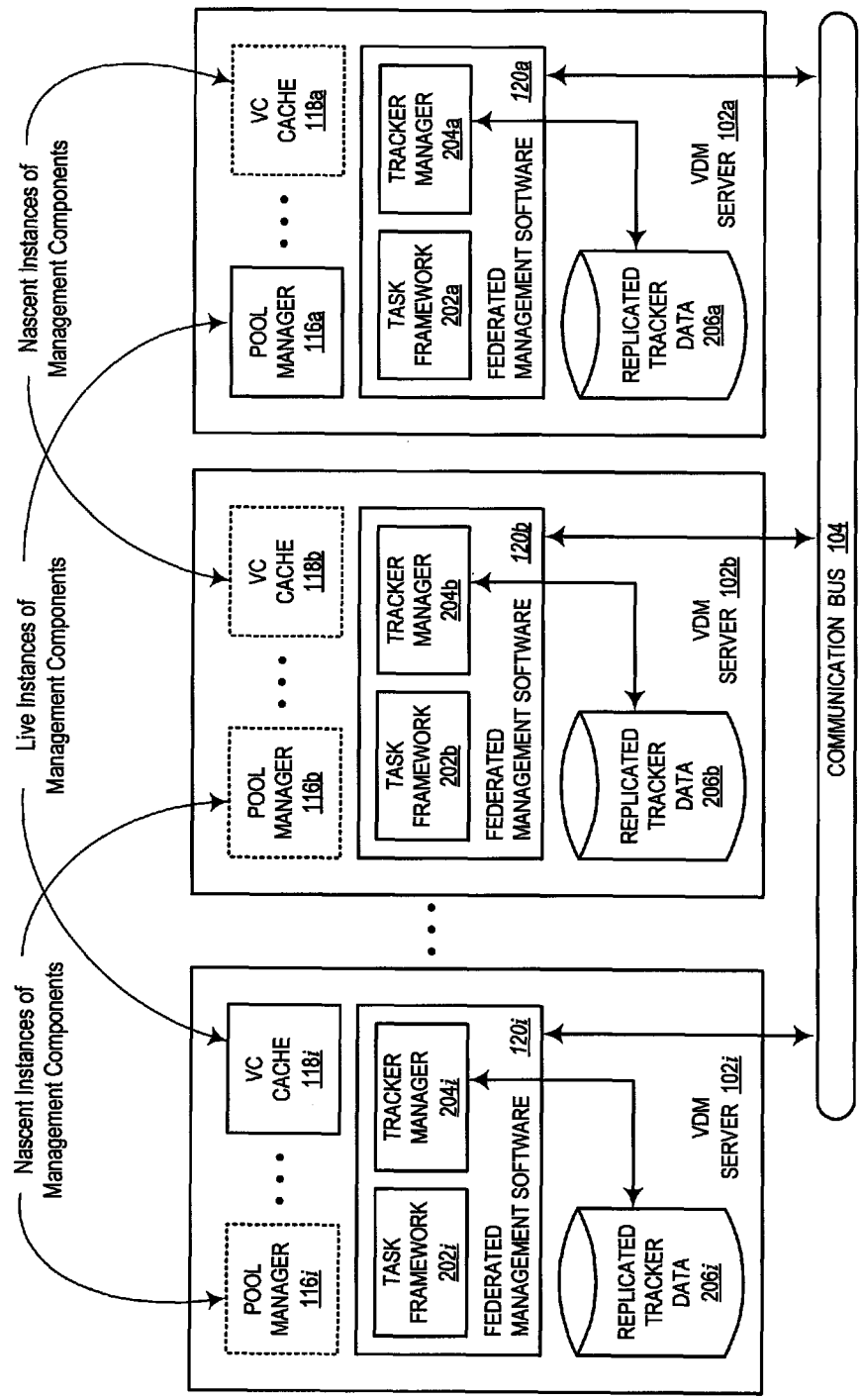
FIG. 2 is a block diagram of three example VDM Servers interacting to provide an example of federated task management.

FIG. 2 is a block diagram of three example enhanced VDM Servers interacting to provide an example of federated task management. In this example, three example enhanced VDM Servers 102a, 102b and 102i form an example Federated VDM Cluster 102 and interact to provide an example of federated task management. Each of the enhanced VDM Servers 102a, 102b and 102i include a task framework component (e.g., task framework 202a residing in the enhanced VDM Server 102a) and a tracker manager component (e.g., tracker manager 204a residing in the enhanced VDM Server 102a) residing in their respective Federated Management Software component (e.g., Federated Management Software 120a residing in the enhanced VDM Server 102a). Information associated with coordinated management of the Virtualization Center 100, and more particularly, information associated with the coordinated management of the enhanced VDM Servers 102a, 102b and 102i that are active in the Federated VDM Cluster 102, resides as information in a suitable local data storage medium, denoted as the Replicated Tracker Data (e.g., Replicated Tracker Data 206a of the enhanced VDM server 102a). In the various embodiments, the Replicated Tracker Data may be any suitable data repository that may reside within or external to the physical or virtual computer system running the VDM server software 108a, including in-memory data storage.

During operation, the active enhanced VDM Servers 102a, 102b and/or 102i manage their respective VMs 128 with respect to the remote users 106 using the VMs 128. Also, each of the active enhanced VDM Servers 102a, 102b and/or 102i coordinate task activities with other enhanced VDM Servers 102a-102i and maintenance of their respective Replicated Tracker Data (e.g., Replicated Tracker Data 206a residing in the enhanced VDM Server 102a, which may reside within or external to the physical or virtual computer system running the VDM server software 108a). Thus, each active enhanced VDM Server 102*a*, 102*b* and/or 102*i* performs various tasks, generally categorized as local tasks, persistent tasks, and federated tasks.

A local task may be local to the particular active enhanced VDM Server 102*a*, 102*b* and/or 102*i*. For example, such local tasks are not load balanced across the Federated VDM Cluster 102 or recovered by enhanced VDM Servers 102*a*-102*i* when the particular active enhanced VDM Server 102*a*, 102*b* and/or 102*i* performing the local task shuts down, interrupts, or otherwise leaves the Federated VDM Cluster 102.

A persistent task may be a type of task that may be executed to completion by the particular active enhanced VDM Server 102*a*, 102*b* and/or 102*i* executing the persistent task. After completion, information of interest to the active enhanced VDM Servers 102*a*, 102*b* and/or 102*i* may be saved to its respective Replicated Tracker Data. Further, the information of interest may be communicated (e.g., broadcasted or otherwise transmitted) as a Replicated Tracker Data Update onto the communication bus 104. For example, each one of the other active enhanced VDM Servers 102*a*, 102*b* and 102*i*, upon receipt of a Replicated Tracker Data Update, may save the received information of interest into their respective Replicated Tracker Data. Thus, information of interest pertaining to a persistent task may be recovered on infrastructure failure if needed.

A federated task may be a type of task that provides information that may be relevant to all of the enhanced VDM Servers 102*a*, 102*b* and 102*i* active in the Federated VDM Cluster 102 and is being executed on behalf of other enhanced VDM Servers in the Federated VDM Cluster 102. Accordingly, a federated task is actively running on one of the VDM servers 102 in the Federated VDM Cluster 102. That is, a Federated Task has only one instance of that federated task running on a designated one of the active enhanced VDM Servers 102*a*, 102*b* and/or 102*i* at a time.

Information of interest associated with a federated task may be dynamically maintained in the Replicated Tracker Data (e.g., Replicated Tracker Data 206*a* residing in the enhanced VDM Server 102*a*). For example, the selected one of the enhanced VDM Servers 102*a*, 102*b* and 102*i* executing the federated task periodically broadcasts a Replicated Tracker Data Update onto the communication bus 104. Each one of the other active enhanced VDM Servers 102*a*, 102*b* and 102*i*, upon receipt of a broadcasted Replicated Tracker Data Update, saves the received information into their respective Replicated Tracker Data. Accordingly, in the event that the particular one of the enhanced VDM Servers 102*a*, 102*b* and/or 102*i* performing the federated task interrupts, leaves the Federated VDM Cluster 102, or quiesces operation of the federated task, another one of the active enhanced VDM Servers 102*a*, 102*b* and/or 102*i* can take over execution of the federated task based upon the information in its respective Replicated Tracker Data (e.g., the Replicated Tracker Data 206*a* residing in the enhanced VDM Server 102*a*).

The Tracker Manager component (e.g., the tracker manager 204*a* residing in the enhanced VDM Server 102*a*) maintains the Replicated Tracker Data (e.g., the Replicated Tracker Data 206*a* residing in the enhanced VDM Server 102*a*) on its respective VDM Server, making information in the Replicated Tracker Data (e.g., the Replicated Tracker Data 206*a* residing in the enhanced VDM Server 102*a*) available to the other active VDM servers. Further, the Tracker Manager causes locally made changes to be replicated by communicating (e.g., forwarding, sending, broadcasting, transmitting, etc.) them to each of the other active enhanced VDM Servers 102*a*, 102*b* and/or 102*i* in the Federated VDM Cluster 102. To replicate the local changes, the Tracker Manager manages the Replicated Tracker Data by reading and writing data to the Replicated Tracker Data. In this way, the local data changes are replicated so that each of the active enhanced VDM Servers 102*a*, 102*b* and 102*i* in the Federated VDM Cluster have a complete copy of the Replicated Tracker Data. Accordingly, each of the active enhanced VDM Servers 102*a*, 102*b* and/or 102*i* in the Federated VDM Cluster 102 receive a consistent set of changes for each tracked item. In some embodiments, other information of interest may be stored by the Tracker Manager Component in its Replicated Tracker Data and/or shared with other other active enhanced VDM Servers 102*a*, 102*b* and/or 102*i* in the Federated VDM Cluster 102. For example, other tasks may store the result of their operations using the Tracker Manager Component.

In various embodiments, there may be no predefined centralized cluster controller, so each of the active VDM Servers work collaboratively with the other active VDM Servers in the Federated VDM Cluster 102. For example, the Tracker Manager replicates local data changes (for example, an add, a change, and/or a remove objects or attributes) in a Replicated Tracker Data update that may be communicated to the other active VDM Servers in the Federated VDM Cluster 102. To illustrate, the executing Pool Manager 116*a* executing on the enhanced VDM Server 102*a* may generate a local data change. The Tracker Manager 204*a* generates and broadcasts a Replicated Tracker Data update so that the local data generated by the Pool Manager 116*a* may be available locally on each of the active enhanced VDM Servers 102*b* and 102*i*. For example, one or more coordination primitives may be provided for efficient distributed update of data, such as, but not limited to, lockless updates based on optimistic writes.

To avoid the need to lock objects to synchronize updates, embodiments may implement an optimistic update strategy by requesting a validated updater. A validated updater takes note of the version of the object when the updater is requested. The update process continues as normal. However, when the updates are applied on the owner enhanced VDM Server (whether local or remote), the owner confirms that the version of the object is the same as the version noted in the validated updater when it was requested. If the version matches, then the update can be applied as normal. If the object version has moved on, this implies that the object has been changed whilst the update was being prepared and executed, and thus indicates that the update is failed and/or indicates a concurrent update failure. On failure, the initiating enhanced VDM Server should repeat the update process, starting by fetching a new validated updater and making the relevant decisions and updates again.

In the various embodiments, the Tracker Manager Component facilitates a lockless update to reduce synchronization requirements between the plurality of other active enhanced VDM Servers 102*a*, 102*b* and/or 102*i* in the Federated VDM Cluster 102. For example, a lockless element update (to add an element to a list, remove an element from the list, or add an element to the list if the element is not already on the list) to a Replicated Tracker Data attribute allows multiple clients to make disjoint updates to the attribute without having to lock the related entry and/or attribute.

In some example embodiments, the local data modification changes may be pre-validated by an external process. Such external actions may be configured based on the Replicated Tracker Data update that are communicated to all of the active enhanced VDM Servers 102*a*, 102*b* and/or 102*i*. Validation, in an exemplary embodiment, may be provided by two kinds of update callbacks, pre-update callbacks and post-update callbacks. A pre-update validating callback is called on the owning node immediately prior to a change being made (e.g., after any coordination for validated operations like validated add). The pre-update validating callback may be useful for coordinating tracker updates with an external system. For example, if each tracker object is being persisted to an external database, then a pre-update validating callback may be used to push the change to a database. If the database update fails, then the database update failure may be reflected by failing the callback, and in turn, cancelling the tracker update. If the operation is vetoed by the callback, then the overall operation is failed for the provided reason. A post-update callback is an informational callback after an object has been added, updated or removed. The post-update callback may be made on the enhanced VDM Servers in the server cluster irrespective of which enhanced VDM Server owns the tracker object in question. An exemplary post-update callback consists of several pieces of information, such as, but not limited to, a type of operation (add, update, remove), an updated tracker object, and/or a set of changes that were applied (for update operations).

The Task Framework component (e.g., Task Framework 202a residing in the enhanced VDM Server 102a) on each of the enhanced VDM Servers 102a, 102b and/or 102i cooperates with its respective Tracker Manager (e.g., Tracker Manager 204a residing in the enhanced VDM Server 102a), using it as a distributed dataset to coordinate tasks between the enhanced VDM Servers 102a, 102b and/or 102i active in the Federated VDM Cluster 102. The Task Framework component supports several types of tasks, and of particular interest, supports coordinated execution of the federated tasks across the Federated VDM Cluster 102.

To illustrate coordinated management of the example active enhanced VDM Servers 102a, 102b and/or 102i, an inactive VDM Server may become active and join the Federated VDM Cluster 102. As the new VDM Server starts up, the new VDM Server would otherwise attempt to create all of the federated tasks that it believes are needed to manage the environment. In the scenario where the new VDM Server is the first active VDM Server in the Federated VDM Cluster 102, this new VDM Server would create and execute all federated tasks. However, a federated task only needs to be executed on a single selected one of the VDM Servers active in the Federated VDM Cluster 102 in order to accomplish its objective for the entire Federated VDM Cluster 102. Thus, at startup under a scenario where there are other active VDM Servers, the new VDM Server need only receive the current Replicated Tracker Data from one of the active VDM Servers to become fully informed of the operation of the Federated VDM Cluster 102 and the other active VDM Servers.

Federated tasks are generally created with predefined names (typically based on their purpose and target) understood by the VDM Servers 102a, 102b and/or 102i. In one example embodiment, Federated task names are used by the Task Framework 202 to determine if a particular federated task is new or is running already. A designated one of the active enhanced VDM Servers 102a, 102b and/or 102i may be designated to configure its Task Framework 202 to move federated tasks across the environment. Thus, as new VDM Servers are added to the Federated VDM Cluster 102, the Task Framework 202 on the designated task managing VDM Server will move selected federated tasks around to the various VDM Servers in the Federated VDM Cluster 102 to use capacity of the new VDM Server. Further, when one of the active enhanced VDM Servers 102a, 102b and/or 102i leaves the Federated VDM Cluster 102, any federated tasks running on the departing VDM Server is transferred to a remaining one of the active enhanced VDM Servers 102a, 102b and/or 102i to ensure that the federated task(s) previously executed by the leaving VDM Server is still running. That is, the Task Framework executing on one of the VDM Servers operating in a management role (to manage executing federated tasks across the Federated VDM Cluster 102) ensures that one of the active enhanced VDM Servers 102a, 102b and/or 102i is running each and every one of the federated tasks that are needed by all of the active enhanced VDM Servers 102a, 102b and/or 102i of the Federated VDM Cluster 102. In some embodiments, the VDM server operating in a management role may be pre-designated.

FIG. 2 illustrates that the active enhanced VDM Server 102a is executing the Pool Manager 116a, which is an example federated task. Nascent instances (non-executing instances) of the pool manager 116 reside at the other active enhanced VDM Servers 102b and 102i. However, the nascent instances of the Pool Managers 116b and 116i are not executing on their respective enhanced VDM Servers 102b and 102i. As described above, the local data change resulting from the execution of a federated task, such as the Pool Manager 116a executing on the enhanced VDM Server 102a, is accessible to all VDM Servers since the local data changes have been replicated into their respective Replicated Tracker Data.

Similarly, enhanced VDM Server 102i may be executing the VC Cache 118i, which is another example federated task. To illustrate, the VC Cache 118 may be configured to make state information of the Virtualization Center 100 available to the other active enhanced VDM Servers 102a and 102b in the Federated VDM Cluster 102 for management and administrative purposes. For example, state information may include identity and optionally operating characteristics of the active enhanced VDM Servers 102a, 102b and/or 102i, the active Virtual Machine Management Servers 124, active VMs 128, clusters, data stores, hosts, resource pools, data disks and other managed entities. The enhanced VDM Server 102i executes the VC Cache 118i to monitor the Virtualization Center 100 for information of interest to all of the active enhanced VDM Servers 102a, 102b and/or 102i, and makes the results available to the active enhanced VDM Servers 102a and 102b using its Tracker Manager 204a. In this example, nascent instances of the VC Cache 118a and 118b reside, respectively, at the other active enhanced VDM Servers 102a and 102b. However, the nascent instances of the VC Cache 118a and 116b are not executing on their respective enhanced VDM Servers 102a and 102b.

One benefit of the Task Framework 202 is the automated distribution and management of federated tasks across all of the active enhanced VDM Servers 102a, 102b and/or 102i in the Federated VDM Cluster 102. The Task Framework 202 stores data and coordinates federated task activities across the available active enhanced VDM Servers 102a, 102b and/or 102i. Federated tasks running on a failed VDM Server are automatically restarted on one of the available active enhanced VDM Servers 102a, 102b and/or 102i.

Federated tasks are visible to all active, participating VDM Servers in the Federated VDM Cluster 102. In an example embodiment, data replicated in the Replicated Tracker Data 206 can advertise federated task characteristics or federated task configurations to enable other VDM Servers to locate federated tasks of interest. For example, federated tasks can determine their load factors (for load balancing) based on task-specific mechanisms. The Task Framework 202 ensures that the definition and execution of federated tasks are separated, allowing the Task Framework 202 to offer different execution models (e.g., varying threading, timing, triggering mechanisms). When a particular federated task's lifetime extends beyond the immediate execution and completion of that federated task (for example, is more continuous, like a daemon or monitoring process), the current state information for that federated task may be communicated to all active VDM Servers as a Replicated Tracker Data update, thereby allowing asynchronous reporting of federated task results and federated task status.

Figure 3:
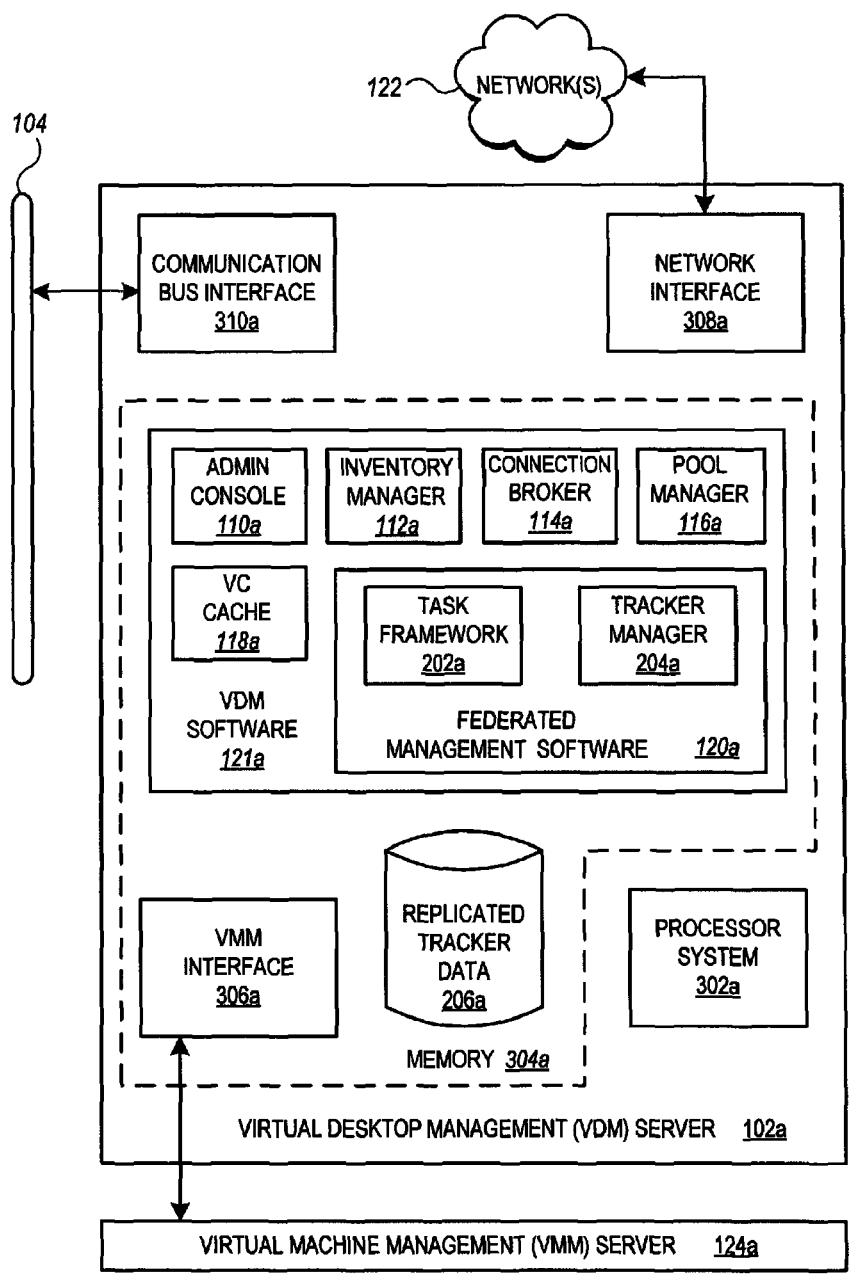
FIG. 3 is a block diagram of selected example components of an example enhanced VDM Server.

FIG. 3 is a block diagram of selected example components of an example VDM Server. In FIG. 3, the enhanced VDM Server 102a is shown comprising a processor system 302a, an optional memory 304a, a VMM interface 306a, a network interface 308a, and a communication interface 310a. In an exemplary embodiment, The VMM interface 306a, the network interface 308a, the communication interface 310a, the Federated Management Software 120a, and/or the Replicated Tracker Data 206a may be implemented as software in the memory 304a or in another suitable storage medium, may be implemented as firmware, and/or may be implemented in a distributed system. In some embodiment, some of the components shown as residing in the memory 304a may instead be stored in another suitable storage medium and/or device. For example, but not limited to, the Replicated Tracker Data 206a may be stored in another storage medium and/or device. Other suitable arrangements are contemplated.

Other components (not shown) reside in the example enhanced VDM Server 102a. In some embodiments, one or more of the processor system 302a, the memory 304a, the VMM interface 306a, the network interface 308a, and the communication interface 310a may be integrated with each other into an integrated component or into a device, and/or may be implemented as virtual components or as virtual devices of a virtual machine. Although shown separately, in some embodiments, the components shown may be decomposed, combined, or arranged differently, and may be implemented in hardware, software, firmware, or in a combination thereof. For example, the VMM interface 306a may be implemented as an application programming interface (API) also stored in the memory 304a. Also, for example, the Replicated Tracker Data 206a may be stored in the memory 304a. Other arrangements are possible.

The processor system 306a may be any suitable commercially available processor system or a special purpose processor system that may be configured to execute the software of the enhanced VDM Server 102a. Memory 304a may be any suitable computer-readable medium configured to store the software that may be retrieved and executed by the processor system 302a. The memory 304a may be a dedicated memory system, may be part of another component or system, and/or may be a distributed memory system. The memory 304a may also include other logic, modules and/or databases not illustrated or described herein. In the example enhanced VDM Server 102a, the Replicated Tracker Data 206 resides in a computer-readable medium that may be separate from the illustrated memory 304a. In other embodiments, the memory 304a may be configured to store the Replicated Tracker Data 206.

In the context of this disclosure, a "computer-readable medium" can be any means that can store, communicate, propagate, or transport the software and/or data associated with the enhanced VDM Server 102a. Furthermore, in some embodiments, some or all of the components of the enhanced VDM server may be implemented or provided in other manners, such as at least partially in firmware and/or hardware, including, but not limited to one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored (e.g., as executable or other machine-readable software instructions or structured data) on a computer-readable medium (e.g., a hard disk; a memory; a network; or a portable media article to be read by an appropriate drive or via an appropriate connection). Some or all of the system components and data structures may also be transmitted via generated data signals (e.g., as part of a carrier wave or other analog or digital propagated signal) on a variety of computer-readable transmission mediums, such as media Y05, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The VMM interface 306a provides connectivity to the Virtual Machine Management Server 124a to manage the underlying Virtual Machine Management Servers. The network interface 308a provides connectivity to the network 122. The communication bus interface 310a provides connectivity to the communication bus 104. The interfaces 306a, 308a, and/or 310a may be physical connectors or the like. The interfaces 306a, 308a, and/or 310a may also include firmware and/or software to facilitate communications between the enhanced VDM Server 102a and the Virtual Machine Management Server 124a, the network 122, and the communication bus 104, respectively. Further, the interfaces 306a, 308a, and/or 310a may be integrated together as a single interface, may be distributed across other computing systems, and/or may be configured to provide connectivity to other devices (not shown).

Figure 4A:
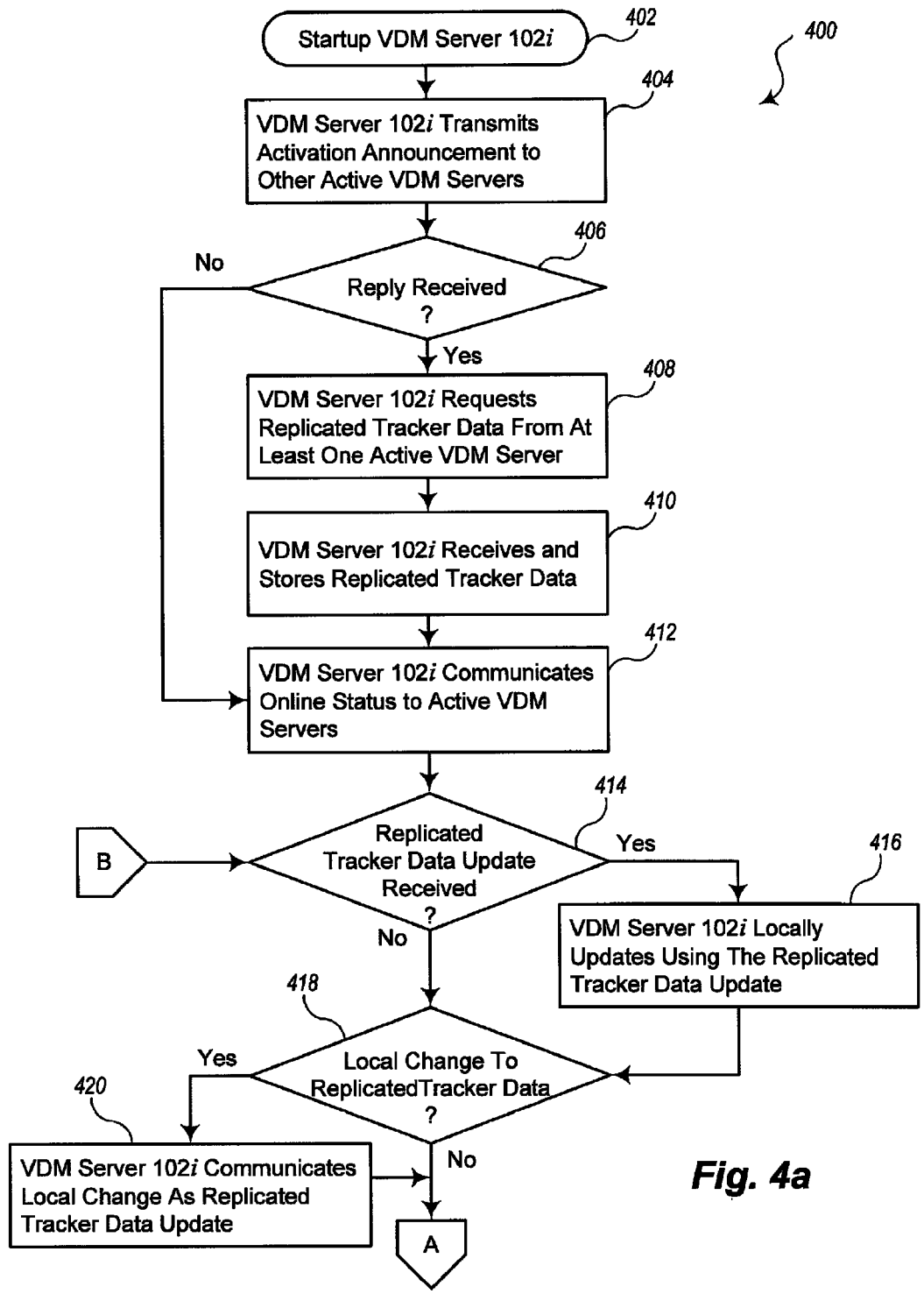
FIGS. 4A and 4B are example flow diagrams of logic executed by an example enhanced VDM Server to startup and join the Federated VDM Cluster.
Figure 4B:
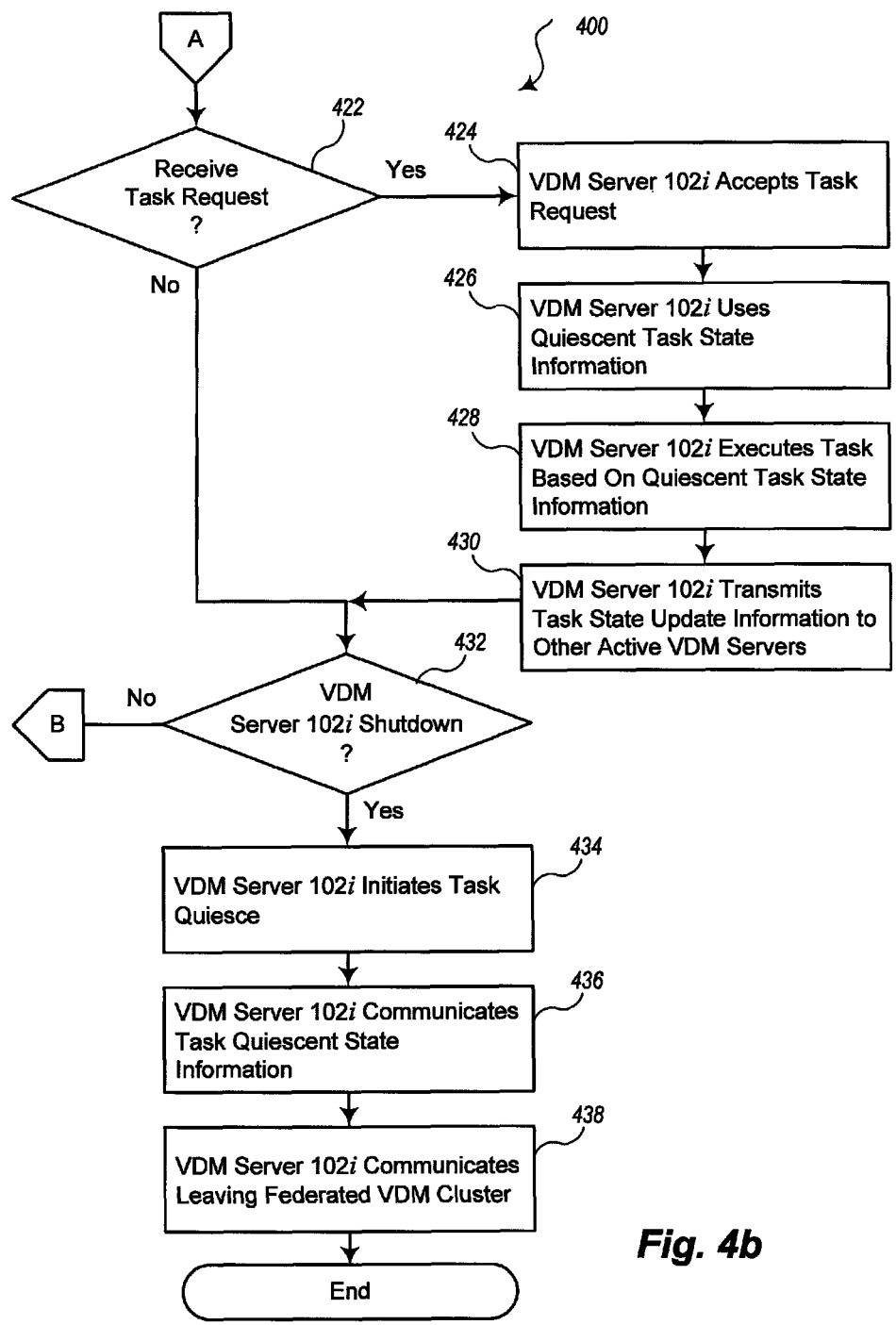

To illustrate various operational aspects of the Virtualization Center 100, example processes (logic) are provided herein. FIGS. 4A and 4B are example flow diagrams of logic executed by an example VDM Server to startup and join the Federated VDM Cluster. More particularly, FIGS. 4A and 4B describes an example of how the example enhanced VDM Server 102i may startup and join the Federated VDM Cluster 102. Other logic can be provided and in other orders to achieve the functions of the Task Framework 202 and/or the Tracker Manager 204 described elsewhere herein. Other components may be invoked as needed to process portions of the described functionality. Also, although this embodiment is described with reference to broadcasted communications, other equivalent methods of transmitting information may be similarly incorporated.

Specifically, in block 402, the enhanced VDM Server 102i starts up. For example, the enhanced VDM Server 102i may execute one or more initialization functions. In block 404, the enhanced VDM Server 102i transmits an activation announcement to all of the active VDM servers of the Federated VDM Cluster 102. By using the activation announcement broadcast, the enhanced VDM Server 102i does not need specific knowledge of which other VDM Servers are active in the Federated VDM Cluster 102. In block 406, a determination is made whether a reply is received from at least one active VDM Server of the Federated VDM Cluster 102. If a reply is received, the enhanced VDM Server 102i is not the only, or is not the first active VDM server. Accordingly, the Replicated Tracker Data 206 is available from at least one other VDM server for its use. Accordingly, the process proceeds to block 408 wherein the enhanced VDM Server 102i requests Replicated Tracker Data 206 from at least one of the active VDM Servers of the Federated VDM Cluster 102. Identification of which particular active VDM Server the Replicated Tracker Data 206 will be requested from may be determined in any suitable fashion. For example, the enhanced VDM Server 102*i* may receive the Replicated Tracker Data 206*a* from the enhanced VDM Server 102*a* if the enhanced VDM Server 102*a* is the first responding VDM Server in the Federated VDM Cluster 102.

In block 410, the enhanced VDM Server 102*i* receives and stores the received information in its Replicated Tracker Data 206*i*. In block 412, the enhanced VDM Server 102*i* broadcasts its online status so that other active VDM Servers are now notified that the enhanced VDM Server 102*i* has joined the Federated VDM Cluster 102.

On the other hand, if in block 406, a reply is not received, the enhanced VDM Server 102*i* is the first or the only active VDM server in the Federated VDM Cluster 102. Accordingly, the Replicated Tracker Data 206 may be not available from another VDM Server. (In some instances, another VDM server may concurrently be joining the Federated VDM Cluster 102, and accordingly, its reply would indicate the start state of that new VDM server and that it also does not have valid Replicated Tracker Data to share with the enhanced VDM Server 102*i*.) The example process proceeds to block 412, wherein the enhanced VDM Server 102*i* broadcasts its online status so that other active VDM Servers in the Federated VDM Cluster 102 are notified that the enhanced VDM Server 102*i* is an active member of the Federated VDM Cluster 102. It is appreciated that when the enhanced VDM Server 102*i* is the first member of the Federated VDM Cluster 102, the enhanced VDM Server 102*i* initiates all federated tasks and generates the first Replicated Tracker Data 206 (which is then communicated to other VDM Servers as they join the Federated VDM Cluster 102).

Further, as the enhanced VDM Server 102*i* is joining the Federated VDM Cluster 102, any Replicated Tracker Data updates that are communicated by other active enhanced VDM Servers 102*a*, 102*b* and/or 102*i* in the Federated VDM Cluster 102 may be received and stored. Thus, when the Replicated Tracker Data is received, the new VDM server may incorporate any received Replicated Tracker Data updates to ensure that its Replicated Tracker Data is current.

The process proceeds to block 414, where a determination is made whether a Replicated Tracker Data update has been received by the enhanced VDM Server 102*i* from another active VDM Server. If a Replicated Tracker Data update has been received, the process proceeds to block 416 wherein the enhanced VDM Server 102*i* updates its Replicated Tracker Data 206*i* and any executing logic using the received Replicated Tracker Data update.

After the updates to the Replicated Tracker Data have been stored at block 416, or if no replicated tracker data updates have been received, the process proceeds to block 418. In block 418, a determination is made whether a change has been made to any executing federated tasks or other information of interest, referred to as a local change, by the enhanced VDM Server 102*i*. If a local change has been made, the process proceeds to block 420 wherein the enhanced VDM Server 102*i* broadcasts a replicated tracker data update having the local change. (In other example embodiments, other means of communication of the Replicated Tracker Data updates may be used, such as directed messaging using standard or proprietary massaging protocols.)

Accordingly, various processes executing on the other active enhanced VDM Servers 102 may be updated with the local change information residing in the replicated tracker data update provided by the enhanced VDM Server 102*i*. Also, the other VDM Servers may update their respective Replicated Tracker Data with the change information from the received Replicated Tracker Data update.

After the Replicated Tracker Data update with the change has been broadcast at block 420, or if no local change has been made, the process proceeds to block 422. In block 422, a determination is made whether a task request has been received by the enhanced VDM Server 102*i*.

It is appreciated that one of the active VDM servers of the Federated VDM Cluster 102 is operating its Task Framework 202 in a management role or controller role. As part of the federated task management role, that particular VDM server tracks which federated tasks are being executed at which particular ones of the active VDM servers in the Federated VDM Cluster 102. The VDM server operating its Task Framework 202 in the management role is responsible for allocating federated tasks among all active VDM servers. Accordingly, the example process of flow diagram 400 assumes that the VDM server operating its Task Framework 202 in the management role has determined that the enhanced VDM Server 102*i* has joined the Federated VDM Cluster 102, and has determined that it may be appropriate for the enhanced VDM Server 102*i* to execute one or more selected federated tasks.

If a task request has been received at block 422, the process proceeds to block 424. Otherwise, the process continues to block 432 to check for another event. In block 424, the enhanced VDM Server 102*i* accepts the task request. The enhanced VDM Server 102*i* then retrieves the federated task from its memory 304*i*, in block 426, and begins execution of the federated task in block 428 using the information pertaining to the federated task that resides in its previously received Replicated Tracker Data 206*i*. The retrieved federated task may be software and/or data that may be run by the enhanced VDM Server 102*i*. The process proceeds to block 430 wherein the enhanced VDM Server 102*i* transmits task state update information to the other active VDM Servers of the Federated VDM Cluster 102. Thus, the other VDM servers are notified that the enhanced VDM Server 102*i* is now responsible for the federated task now executing on the enhanced VDM Server 102*i*).

After the enhanced VDM Server 102*i* transmits the task state information, or if it is determined in block 422 that no task request has been received, the process proceeds to block 432. In block 432, a determination is made whether the enhanced VDM Server 102*i* is going to shut down (or is otherwise going to leave or exit the Federated VDM Cluster 102). If the enhanced VDM Server 102*i* is not going to be shutting down or is not leaving the Federated VDM Cluster 102, the process returns to block 414. Thus, it is appreciated that the example process illustrates continuous event looping through blocks 414, 418, and 422 so that the enhanced VDM Server 102*i* is regularly monitoring for receipt of replicated tracker data updates, local changes, and new federated task assignments, concurrently. In the various embodiments, the looping may be continuous, may be periodic, or event driven, such as when a message is received or generated. The exemplary looping may be partial and/or in a different order. The exemplary looping process through blocks 414, 418, and 422 is illustrated merely for the purpose of conceptually describing an exemplary embodiment.

However, if in block 432, a determination is made that the enhanced VDM Server 102*i* is going to shut down (or is otherwise going to leave or exit the Federated VDM Cluster 102), the process proceeds to block 434. In block 434, the enhanced VDM Server 102*i* initiates a task quiesce of all federated tasks that it is executing. The quiescencing of the federated tasks permits the enhanced VDM Server 102*i* to wind down and terminate execution of each federated task in an orderly manner. Thus, information and/or data relevant to the quiescing federated task, referred to as "task quiescent state information," may be determined by the enhanced VDM Server 102*i*.

The process then continues to block 436, wherein the enhanced VDM Server 102*i* broadcasts the task quiescent state information to the other VDM servers of the Federated VDM Cluster 102. For example, the task quiescent state information may be transmitted in a replicated tracker data update. The received replicated tracker data update with the task quiescent state information may be used by the remaining active VDM servers to update their respective Replicated Tracker Data 206. The process then proceeds to block 438, wherein the enhanced VDM Server 102*i* broadcasts that it is leaving the Federated VDM Cluster 102, and the process ends or continues to other processes. At this juncture, the enhanced VDM Server 102*i* may proceed with an orderly shut down process, and/or perform other processes which necessitated its leaving the Federated VDM Cluster 102.

Figure 5:
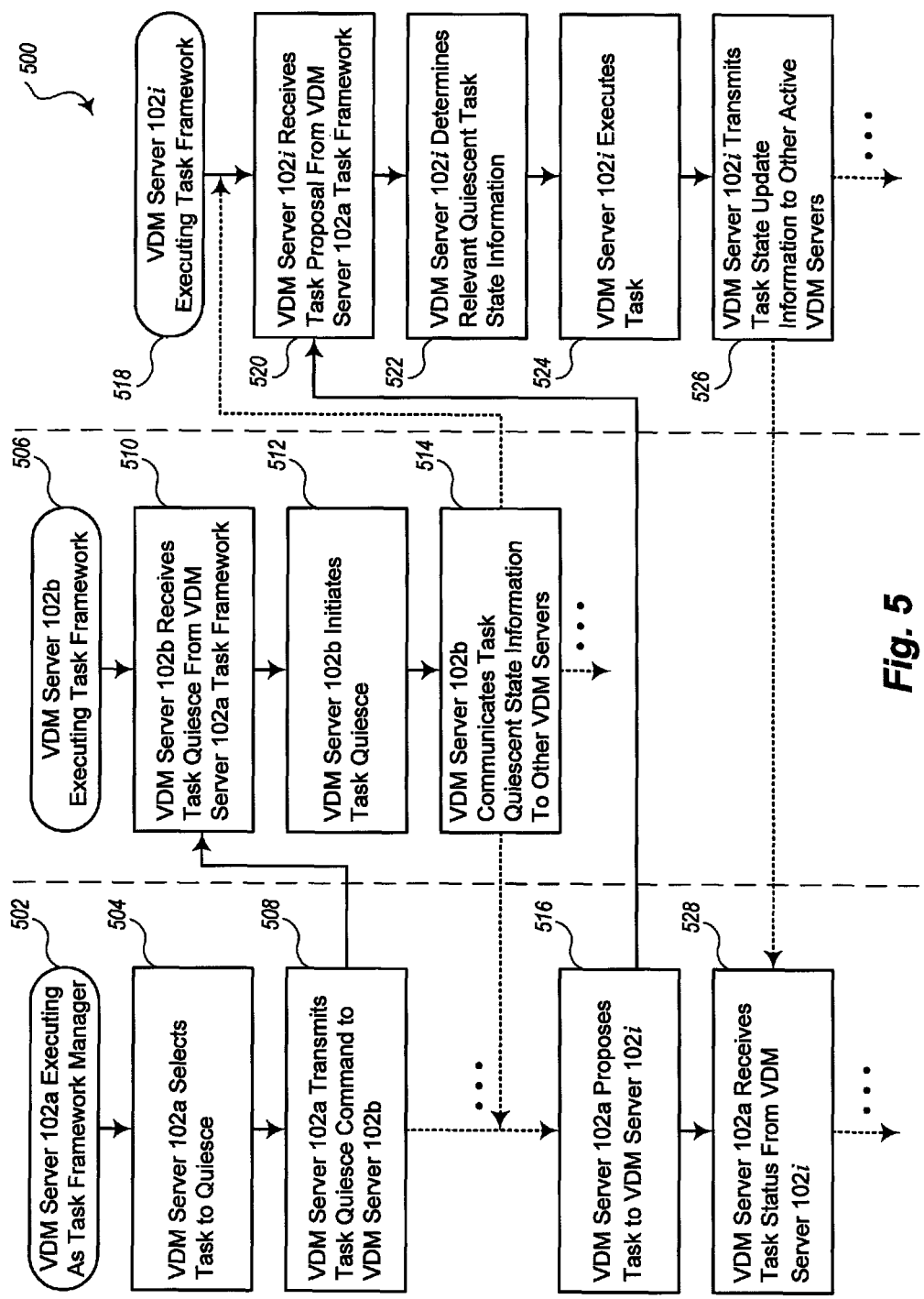
FIG. 5 is an example flow diagram of logic executed by example active enhanced VDM Servers to move a federated task from one enhanced VDM Server to another enhanced VDM Server.

FIG. 5 is an example flow diagram 500 of logic executed by the example active enhanced VDM Servers 102*a*, 102*b* and 102*i* to move a federated task from the enhanced VDM Server 102*b* to the enhanced VDM Server 102*i*. In this example process, the enhanced VDM Server 102*a* is operating its Task Framework 202 in a management role. Other logic can be provided and in other orders to achieve the functions of the Task Framework 202 and/or the Tracker Manager 204 described elsewhere herein. Other components may be invoked as needed to process portions of the described functionality.

As part of the federated task management role, the enhanced VDM Server 102*a* tracks which federated tasks are being executed at which particular ones of the active VDM servers in the Federated VDM Cluster 102. Thus, in block 502 the enhanced VDM Server 102*a* is operating its Task Framework 202 in the management role and is responsible for allocating federated tasks among all active VDM servers.

Accordingly, in block 504, the enhanced VDM Server 102*a* is operating its Task Framework 202 in the management role and determines that the enhanced VDM Server 102*b* should quiesce a selected federated task. That is, the enhanced VDM Server 102*a* has determined that the enhanced VDM Server 102*i* should take over execution of a federated task currently executing under the control of the enhanced VDM Server 102*b*, as denoted in block 506. For example, the federated task may move from the enhanced VDM Server 102*b* if unused computing capacity may be available on the enhanced VDM Server 102*i*.

In block 508, the enhanced VDM Server 102*a* transmits a task quiesce command to the enhanced VDM Server 102*b*, which may be received by the enhanced VDM Server 102*b* at block 510. In block 512, the enhanced VDM Server 102*b* initiates the quiesce of the selected federated task. In block 514, the enhanced VDM Server 102*b* broadcasts the determined quiesce task state update information to the other active VDM Servers of the Federated VDM Cluster 102. Accordingly, the other VDM servers are notified that the enhanced VDM Server 102*b* is no longer responsible for the federated task. Also, the enhanced VDM Server 102*i* is understood be executing (in block 518) so as to have received the quiesce task state update information, and therefore has updated its Replicated Tracker Data 206*i* accordingly.

In block 516, the enhanced VDM Server 102*a* proposes the federated task to the enhanced VDM Server 102*i*, which may be received in block 520. The enhanced VDM Server 102*i* determines the previously received quiesce task state update information stored in the Replicated Tracker Data 206*i* residing in its memory 304*i* in block 522, and begins execution of the federated task in block 524. The process proceeds to block 526, wherein the enhanced VDM Server 102*i* broadcasts (or otherwise transmits) task state update information to the other active VDM Servers of the Federated VDM Cluster 102, which may be received by the VDM server 102*a* in block 528. Thus, the other VDM servers are notified that the enhanced VDM Server 102*i* is now responsible for the federated task now executing on the enhanced VDM Server 102*i*.

Figure 6:
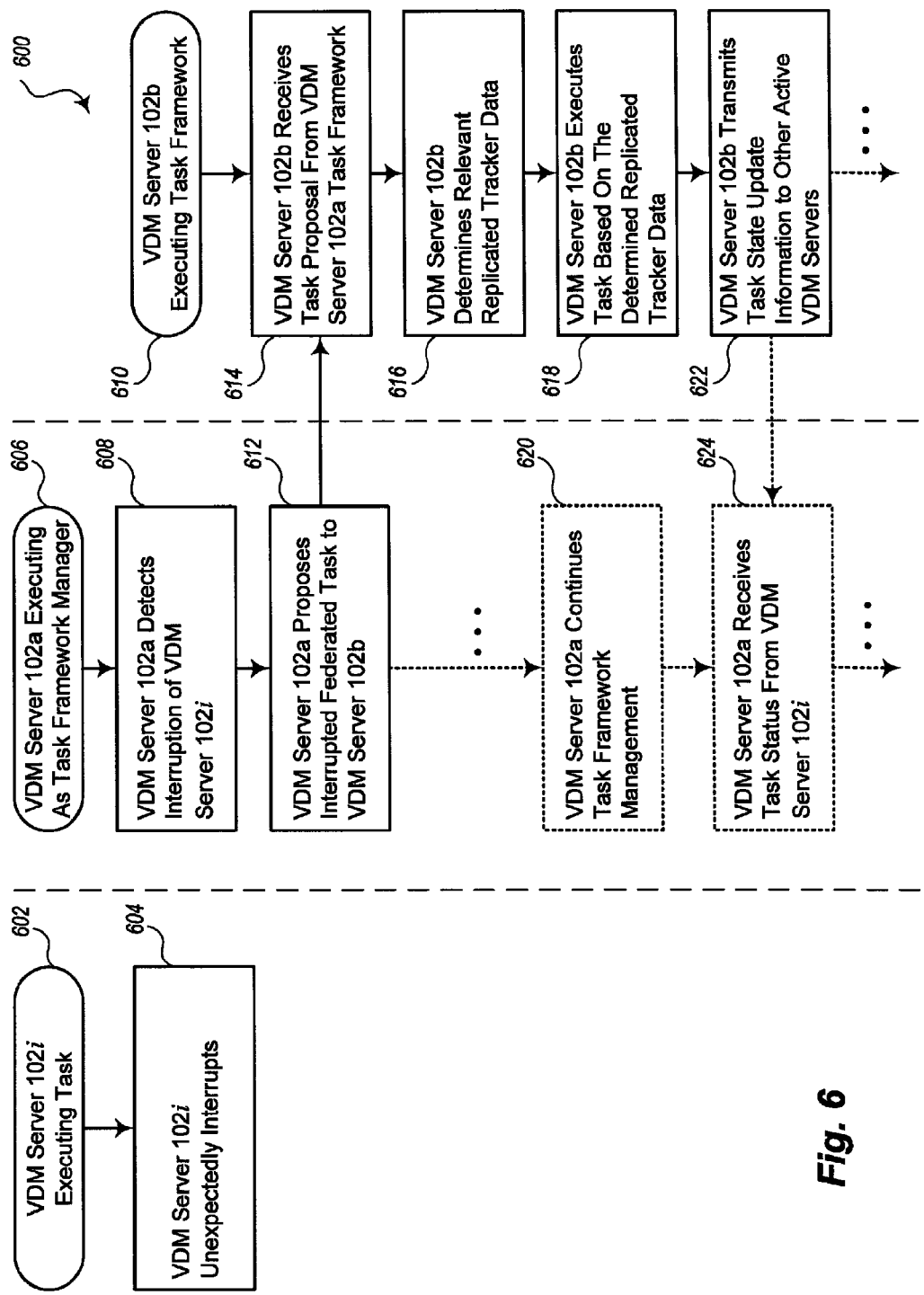
FIG. 6 is an example flow diagram of logic executed by example active enhanced VDM Servers to move a federated task to a VDM Server when the enhanced VDM Server executing a federated task unexpectedly interrupts, unexpectedly shuts down, or otherwise unexpectedly leaves the Federated VDM Cluster.

FIG. 6 is an example flow diagram 600 of logic executed by the example active enhanced VDM Servers 102*a* and 102*b* to move a federated task to the enhanced VDM Server 102*b* when the enhanced VDM Server 102*i* unexpectedly interrupts execution of a federated task, unexpectedly shuts down, or otherwise unexpectedly leaves or exits the Federated VDM Cluster 102. Other logic can be provided and in other orders to achieve the functions of the Task Framework 202 and/or the Tracker Manager 204 described elsewhere herein. Other components may be invoked as needed to process portions of the described functionality.

In block 602, the enhanced VDM Server 102*i* is executing the federated task. In block 604, in this example process, the enhanced VDM Server 102*i* unexpectedly interrupts execution of one or more, or even all of, its executing federated tasks. In block 606, the enhanced VDM Server 102*a* is operating its Task Framework 202 in a management role.

As part of the federated task management role, the enhanced VDM Server 102*a* tracks which federated tasks are being executed at which particular ones of the active VDM servers in the Federated VDM Cluster 102. Thus, in block 608 the enhanced VDM Server 102*a* detects the interruption of the enhanced VDM Server 102*i*. For example, all active VDM Servers may, from time to time, broadcast their status. Absence of such status broadcasts may indicate the absence of the enhanced VDM Server 102*i*. Accordingly, the enhanced VDM Server 102*a* determines that the enhanced VDM Server 102*b*, which is executing its Task Framework 202*b* in block 610, should take over execution of the federated task that was previously executing on the enhanced VDM Server 102*i*.

In block 612, the enhanced VDM Server 102*a* proposes the federated task to the enhanced VDM Server 102*b*, which is received in block 614. The enhanced VDM Server 102*b* then retrieves determined relevant information pertaining to the federated task from its Replicated Tracker Data 206*b* in block 616. In block 618, the enhanced VDM Server 102*b* begins execution of the federated task using the information pertaining to the federated task that resides in its previously received Replicated Tracker Data 206*b* based on the determined Replicated Tracker Data. It is appreciated that the enhanced VDM Server 102*a* continues to perform various tasks, as indicated in block 620.

In block 622, the enhanced VDM Server 102*i* broadcasts or otherwise transmits task state update information to the other active VDM Servers of the Federated VDM Cluster 102, which may be received, for example, by the enhanced VDM Server 102*a* in block 624. Thus, the other VDM servers are notified that the enhanced VDM Server 102*b* is now responsible for the federated task now executing on the enhanced VDM Server 102*b*. It is appreciated that execution of the task continues on the enhanced VDM Server 102*b* such that updated federated task information may be continuously and automatically provided to the other active VDM servers in the Federated VDM Cluster 102.

Of note, because a federated task may be capable of executing on each of the active (participating) VDM Servers in a cluster, if for some reason there is a communication problem that causes the cluster to sever, thereby resulting in one or more sub-clusters, then each sub-cluster can then initiate or continue to execute its version of the federated task. The partitioning of a server cluster into two or more sub-clusters may be referred to as a split brain event. Within the federated management environment, the servers of the cluster are continually monitoring the membership of the cluster. When a split brain event occurs, each server will determine which other servers appear to still be accessible and hence which servers lie within the same sub-cluster. Using this information, the servers are able to identify tasks which may have handlers that are instantiated on servers that no longer form part of the visible sub-cluster. Another tracker instance in the replicated tracker (with an object per server) may be then updated to contain a list of tasks for which inactive federated tasks need to be instantiated for one of the servers in the sub-cluster. As this information is being maintained in the tracker, embodiments ensure that for any one federated task whose handlers need to be instantiated, that the entry appears once and only once. Each node in the common sub-cluster accesses this portion of the tracker to check for tasks that should have handlers instantiated on that a server and then instantiates those handlers. If the server fails, even before the handlers have been instantiated, other servers can take its place by repeating the original process of selecting a server to instantiate the handlers. Each of the sub-clusters will continue to perform just as the one larger cluster had performed prior to split brain event. In the context of a VDM deployment, users who have accessed desktops, or who will access desktops, through a particular node in this cluster, will not see their service disrupted by the split brain environment. The node that was contributing to providing users with functionality before the event continues to do so after the event.

Thus, the sub-clusters can continue operation without experiencing loss of service because each sub-cluster is capable of running and starting up the federated task. Therefore the flexible architecture of the federated task management automatically covers situations where specific nodes/servers fall out of communication from the cluster as well as communication path problems that result in some nodes/servers being unable to communicate with other nodes/servers.

Figure 7:
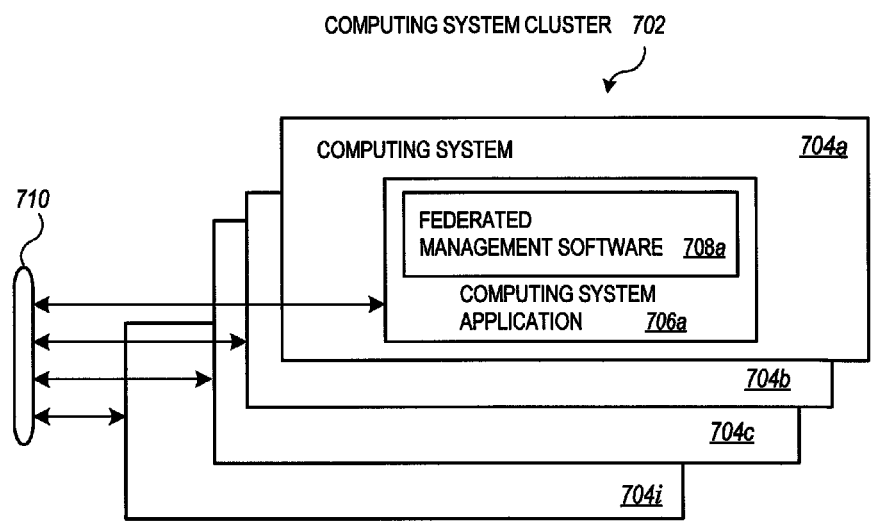
FIG. 7 is a block diagram of an example alternative embodiment.

FIG. 7 is a block diagram of an example alternative embodiment implemented in a computing system cluster 702. The computing system cluster 702 is comprised of a plurality of active computing systems 704a-704i operating as members of the computing system cluster 702. Each of the computing systems have at least one computing system application and federated management software. For example, the computing system 704a has at least one computing system application 706a and the federated management software 708a. The active computing systems 704a-704i are communicatively coupled via communication bus 710 or other suitable communication medium.

The computing system cluster 702 may be configured to perform any task or functionality of interest wherein a group of the computing systems 704a-704i cooperatively operate as a cluster or group. Thus, it is appreciated that some above-described embodiment techniques implemented in the Virtualization Center 100 may be readily applied to the computing system cluster 702.

Embodiments of the tracker manager and task framework components may be implemented in other types of server systems to manage federated tasks across a federated server system. An example alternative use of Federated Management may be for the control of a web-based printing solution server system.

Users connect to one of a number of enhanced web servers in order to submit jobs and monitor their progress. In an exemplary application, in a backend of a printing server system are number of network-connected printers. An exemplary federated task is to query each printer to get the printer's current state (online, offline, out of paper, queue length, current queue job details, etc). The printer information may be stored in the replicated tracker data that is maintained at each of the enhanced web servers. The enhanced web servers can then manage printing at a selected printer for a particular client user.

In another exemplary application, in a consumer product purchasing server system are a number of network-connected servers that are configured to accept product orders, via the Internet or the like, from many consumers that are concurrently connected to the product purchasing server system. Exemplary federated tasks may be used to coordinate orders for like products, manage product distribution, manage product inventory, determine product availability, implement product reorder for supplying vendors, monitor product quality, profitability and/or cost, manage changes to product pricing, etc. The product-related information may be stored in replicated tracker data that is maintained at each of the enhanced network-connected servers. The enhanced network-connected servers can then manage product ordering and other services for many different products for each connected particular customer purchasing one or more products that are available from the product purchasing server system.

The Federated Management software ensures that each federated task is always running at some designated server in the cluster. The enhanced web servers can now use the replicated tracker data to satisfy the user requests rather than having to query the printers on-demand or monitor all the printers from each web server.

Other uses for federated task management may be similarly incorporated.

Appendix I below, incorporated herein by reference in its entirety, describes a non-limiting exemplary implementation of the task framework component, the tracker manager component, and the associated replicated tracker data. Other embodiments may be implemented differently.

From the foregoing it will be appreciated that, although specific embodiments have been described herein for purposes of illustration, various modifications may be made without deviating from the spirit and scope of the present disclosure. For example, the methods and systems for performing coordinated federated management of a plurality of VDM Servers discussed herein are applicable to other architectures other than a VMware Inc. architecture. Also, the methods and systems discussed herein are applicable to differing protocols, communication media (optical, wireless, cable, etc.) and devices (such as wireless handsets, electronic organizers, personal digital assistants, portable email machines, game machines, pagers, and/or navigation devices such as GPS receivers, etc.).

The invention claimed is:

1. A non-transitory computer-readable storage medium containing instructions configured to control a processor residing in a server operating in a virtualization environment, the server associated with one or more remote users' connections to one or more virtual desktops in a virtualization environment, the instructions configured when executed, to perform a method comprising:

upon startup, dynamically joining a federated server cluster as a first one of a plurality of servers that belong to the federated server cluster, after a first federated task has already been executing on an other one of the plurality of servers;

retrieving an indication of the first federated task;

executing the first federated task as an only instance of the executing first federated task over the plurality of servers of the federated server cluster in the virtualization environment wherein the first federated task performs and coordinates between the plurality of servers a first virtualization related management operation on behalf of all of the servers in the federated server cluster, thereby alleviating a need for each of the plurality of servers to execute its own first management operation, and wherein the first federated task, once initially executed, runs continuously on exactly one of the plurality of servers in the federated server cluster until the first federated task is terminated;

generating first federated task information pertaining to the executing instance of the first federated task;

storing the first federated task information in local replicated tracker data;

communicating the first federated task information as first federated task update information to the other ones of the plurality of servers of the federated server cluster, such that the other ones of the plurality of servers of the federated server cluster can store and replicate the first federated task information in their respective local replicated tracker data;

receiving second federated task update information pertaining to a second federated task executing on a second one of the servers of the federated server cluster as an only instance of the executing second federated task over the plurality of servers of the federated server cluster, wherein the second federated task is separate and distinct from the first federated task, wherein the second federated task performs and coordinates between the plurality of servers a second virtualization related management operation on behalf of all of the servers in the federated server cluster, thereby alleviating a need for each of the plurality of servers to execute its own second virtualization related management operation, wherein the second federated task, once initially executed, runs continuously on exactly one of the plurality of servers in the federated server cluster until the second federated task is terminated, and wherein the second federated task update information includes information determined by the instance of the second federated task; and storing the second federated task update information into the local replicated tracker data.

2. The computer-readable storage medium of claim 1 wherein the method further comprises:
retrieving the first federated task information from its local replicated tracker data; and
executing the first federated task based upon the retrieved first federated task information.

3. The computer-readable storage medium of claim 1 wherein retrieving the indication of the first federated task comprises:
retrieving the indication of the first federated task from a plurality of federated tasks.

4. The computer-readable storage medium of claim 1 wherein the method further comprises:
receiving a command from one of the other plurality of servers of the federated server cluster to quiesce the first federated task;
executing the first federated task to a quiesce state;
generating quiesce state task information pertaining to the quiesced first federated task; and
transmitting the quiesce state task information to the other ones of the plurality of servers of the federated server cluster, wherein the other plurality of servers of the federated server cluster store the quiesce state task information in their respective local replicated tracker data.

5. The computer-readable storage medium of claim 4 wherein executing the first federated task to a quiesce state comprises:
ending execution of the first federated task.

6. The computer-readable storage medium of claim 1 wherein the method further comprises:
receiving a request to execute a third federated task from one of the other plurality of servers of the federated server cluster;
retrieving an indication of the third federated task;
executing the third federated task as an only instance of the executing third federated task over the plurality of servers of the federated server cluster, wherein the third federated task performs a third virtualization related management operation on behalf of all of the servers in the federated server cluster, thereby alleviating a need for each of the plurality of servers to execute its own third virtualization related management operation; and
transmitting status indicating execution of the third federated task to the other ones of the plurality of servers of the federated server cluster.

7. The computer-readable storage medium of claim 6 wherein the method further comprises:
generating third federated task information pertaining to the executing instance of the third federated task;
storing the third federated task information in local replicated tracker data; and
transmitting the new third federated state task information to the other ones of the plurality of servers of the federated server cluster, wherein the other plurality of servers of the federated server cluster store and replicate the new third federated state information in their respective local replicated tracker data.

8. The computer-readable storage medium of claim 6 wherein executing the third federated task comprises:
retrieving third federated task information from the replicated tracker data; and
executing the third federated task based upon the retrieved third federated task information.

9. The computer-readable storage medium of claim 6 wherein the method further comprises:
transmitting an acceptance of the third federated task to the other plurality of servers of the server cluster.

10. The computer-readable storage medium of claim 1 wherein the method further comprises:
determining interruption of the second one of the servers of the federated server cluster, wherein the second federated task has ceased executing;
receiving an indication to execute the second federated task;
executing the second federated task as an only instance of the executing second federated task over the plurality of servers of the federated server cluster, thereby moving execution of the only instance of the executing second federated task to the first server; and
transmitting status indicating execution of the second federated task to the other ones of the plurality of servers of the federated server cluster.

11. The computer-readable storage medium of claim 10 wherein the method further comprises:

generating new second federated task information pertaining to the executing instance of the second federated task;

storing the new second federated task information in the local replicated tracker data; and transmitting the new second federated task information as new second federated task update information to the other ones of the plurality of servers of the federated server cluster, such that the other plurality of servers of the federated server cluster can store the new second federated task information in their respective local replicated tracker data.

12. The computer-readable storage medium of claim 1 wherein the storage medium is computer memory in a computer system.

13. A server computing system, the server associated with one or more remote users' connections to one or more virtual desktops in a virtualization environment comprising:

a memory;

a processor system communicatively coupled to the memory and a communication bus, the communication bus communicatively coupled to a plurality of other servers operating as members of a federated server cluster;

a plurality of federated tasks residing in the memory and executable by the processor system, wherein each federated task performs a separate and distinct coordinated virtualization related management operation and is configured to execute on one of the plurality of servers as an only instance of the federated task in the federated server cluster on behalf of all of the servers in the federated server cluster thereby alleviating a need for each of the plurality of servers to execute its own virtualization related management operation;

replicated tracker data accessible by the processor system, wherein the replicated tracker data comprises current state information about each of the federated tasks; and a federated software management component residing in the memory and configured, when executed by the processor system, to:

upon startup, dynamically join the federated server cluster;

cooperatively identify by communication with the others of the plurality of servers in the federated server cluster at least a first one of the plurality of federated tasks for execution on the server, receive task update information determined by an executing instance of a second one of the plurality of federated tasks executing as an only instance of the second federated task on another one of the plurality of servers and received over the communication bus, and store the received task update information determined by the second federated task into the replicated tracker data.

14. The server of claim 13 wherein the server comprises:

a tracker manager residing in the memory and configured, when executed, to receive the task update information determined by the second federated task, and to store the task update information determined by the second federated task into the replicated tracker data.

15. The server of claim 14 wherein the tracker manager is further configured to generate new task update information determined by an executing instance of the first federated task executing on the processor system, and wherein the new task update information is stored into the replicated tracker data.

16. The server of claim 15 wherein the tracker manager is further configured to transmit the new task update information determined by the executing instance of the first federated task onto the communication bus, wherein the new task update information can be stored by the plurality of other servers operating as members of the federated server cluster in their respective replicated tracker data.

17. The server of claim 15 wherein the tracker manager is configured to transmit the new task update information via a broadcast message.

18. The server of claim 13 wherein the replicated tracker data resides in the memory.

19. The server of claim 13 wherein the federated server cluster is configured to provision a plurality of virtual machines (VMs) to a plurality of users.

20. A non-transitory computer-readable storage medium containing instructions configured, when executed, to control an enhanced server actively running as a member of a federated server cluster comprising a plurality of servers, by performing a method comprising:

retrieving an indication of a first federated task that has already been executing on an other one of the plurality of servers;

executing the first federated task as an only instance of the executing first federated task over the plurality of servers of the federated server cluster, wherein the first federated task performs and coordinates between the plurality of servers a first ongoing management operation on behalf of all of the servers in the federated server cluster thereby alleviating a need for each of the plurality of servers to execute its own first ongoing management operation;

generating first federated task information pertaining to the executing instance of the first federated task;

storing the first federated task information in local replicated tracker data;

communicating the first federated task information as first federated task update information to the other ones of the plurality of servers of the federated server cluster, such that the other ones of the plurality of servers of the federated server cluster can store and replicate the first federated task information in their respective local replicated tracker data;

receiving second federated task update information pertaining to a second federated task executing on a second one of the servers of the federated server cluster as an only instance of the executing second federated task over the plurality of servers of the federated server cluster, wherein the second federated task is distinct and separate from the first federated task, wherein the second federated task performs and coordinates between the plurality of servers a second ongoing management operation on behalf of all of the servers in the federated server cluster, thereby alleviating a need for each of the plurality of servers to execute its own second ongoing management operation, and wherein the second federated task update information includes information determined by the instance of the second federated task; and storing the second federated task update information into the local replicated tracker data.

21. The computer-readable storage medium of claim 20 wherein the method further comprises:
- receiving a command to quiesce the first federated task and a request to execute a new federated task from one of the other plurality of enhanced servers of the federated server cluster;
- executing the first federated task to a quiesce state;
- generating quiesce state task information pertaining to the quiesced first federated task; and
- communicating the quiesce state task information to the other ones of the plurality of enhanced servers of the federated server cluster, wherein the other plurality of enhanced servers of the federated server cluster store the quiesce state task information in their respective local replicated tracker data.

22. The computer-readable storage medium of claim 20 wherein the method further comprises:
- receiving a request to execute a new federated task from one of the other plurality of enhanced servers of the federated server cluster;
- retrieving an indication of the new federated task;
- executing the new federated task as an only instance of the executing new federated task over the plurality of enhanced servers of the federated server cluster;
- generating new state task information pertaining to the new federated task; and
- communicating the new state task information to the other ones of the plurality of enhanced servers of the federated server cluster, wherein the other plurality of enhanced servers of the federated server cluster store the new state task information in their respective local replicated tracker data.

23. The computer-readable storage medium of claim 20 wherein the method further comprises:
- determining interruption of the second one of the servers of the federated server cluster, wherein the second one of the servers has ceased executing the second federated task;
- receiving an indication to execute the second federated task;
- executing the second federated task as an only instance of the executing second federated task over the plurality of servers of the federated server cluster; and
- transmitting status indicating execution of the second federated task to the other ones of the plurality of servers of the federated server cluster.

24. The computer-readable storage medium of claim 23 wherein the method further comprises:
- generating new second federated task information pertaining to the executing instance of the second federated task;
- storing the new second federated task information in the local replicated tracker data; and
- transmitting the new second federated task information as new second federated task update information to the other ones of the plurality of servers of the federated server cluster, such that the other plurality of servers of the federated server cluster can store the new second federated task information in their respective local replicated tracker data.

25. A non-transitory computer-readable storage medium containing instructions configured to control a processor residing in a virtual desktop management (VDM) server of a plurality of VDM servers of a federated virtual desktop management (VDM) server cluster, the VDM server associated with one or more remote users' connections to one or more virtual desktops in a virtualization environment, the instructions configured, when executed, to perform a method comprising:
- retrieving an indication of a first federated task;
- executing the first federated task as an only instance of the executing first federated task over the plurality of VDM servers of the federated virtual desktop management (VDM) server cluster, wherein the first federated task performs and coordinates between the plurality of VDM servers a first virtualization related management operation on behalf of all of the servers in the federated server cluster thereby alleviating a need for each of the plurality of servers to execute its own first virtualization related management operation, and wherein the first federated task, once initially executed, runs continuously on exactly one of the plurality of VDM servers in the federated server cluster until the first federated task is terminated;
- generating first federated task information pertaining to the executing instance of the first federated task;
- storing the first federated task information in local replicated tracker data;
- communicating the first federated task information as first federated task update information to the other ones of the plurality of VDM servers of the federated VDM server cluster, such that the other plurality of VDM servers of the federated VDM server cluster can store and replicate the first federated task information in their respective local replicated tracker data;
- receiving second federated task update information pertaining to a second federated task executing on a second one of the VDM servers of the federated VDM server cluster as an only instance of the executing second federated task over the plurality of VDM servers of the federated VDM server cluster, wherein the second federated task is separate and distinct from the first federated task, wherein the second federated task performs and coordinates between the plurality of VDM servers a second virtualization related management operation on behalf of all of the servers in the federated server cluster thereby alleviating a need for each of the plurality of servers to execute its own virtualization related management operation, and wherein the second federated task update information includes information determined by the instance of the second federated task; and
- storing the second federated task update information into the local replicated tracker data.

26. The computer-readable storage medium of claim 25 wherein the method further comprises:
- retrieving the first federated task information from its local replicated tracker data; and
- executing the first federated task based upon the retrieved first federated task information.

27. The computer-readable storage medium of claim 25 wherein retrieving the indication of the first federated task comprises:
- retrieving the indication of the first federated task from a plurality of federated tasks.

28. The computer-readable storage medium of claim 25 wherein the method further comprises:
- receiving a command from one of the other plurality of VDM servers of the federated VDM server cluster to quiesce the first federated task;
- executing the first federated task to a quiesce state;
- generating quiesce state task information pertaining to the quiesced first federated task; and transmitting the quiesce state task information to the other ones of the plurality of VDM servers of the federated VDM server cluster, wherein the other plurality of VDM servers of the federated VDM server cluster store the quiesce state task information in their respective local replicated tracker data.

29. The computer-readable storage medium of claim 28 wherein executing the first federated task to a quiesce state comprises:
ending execution of the first federated task.

30. The computer-readable storage medium of claim 25 wherein the method further comprises:
receiving a request to execute a third federated task from one of the other plurality of VDM servers of the federated VDM server cluster;
retrieving an indication of the third federated task;
executing the third federated task as an only instance of the executing third federated task over the plurality of VDM servers of the federated VDM server cluster; and
transmitting status indicating execution of the third federated task to the other ones of the plurality of VDM servers of the federated VDM server cluster.

31. The computer-readable storage medium of claim 30 wherein the method further comprises:
generating third federated task information pertaining to the executing instance of the third federated task;
storing the third federated task information in local replicated tracker data; and
transmitting the new third federated state task information to the other ones of the plurality of VDM servers of the federated VDM server cluster, wherein the other plurality of VDM servers of the federated VDM server cluster store the new third federated state information in their respective local replicated tracker data.

32. The computer-readable storage medium of claim 30 wherein executing the third federated task comprises:
retrieving third federated task information from the replicated tracker data; and
executing the third federated task based upon the retrieved third federated task information.

33. The computer-readable storage medium of claim 30 wherein the method further comprises:
transmitting an acceptance of the third federated task to the other plurality of VDM servers of the VDM server cluster.

34. The computer-readable storage medium of claim 25 wherein the method further comprises:
determining interruption of the second one of the VDM servers of the federated VDM server cluster, wherein the second federated task has ceased executing;
receiving an indication to execute the second federated task;
executing the second federated task as an only instance of the executing second federated task over the plurality of VDM servers of the federated VDM server cluster; and
transmitting status indicating execution of the second federated task to the other ones of the plurality of VDM servers of the federated VDM server cluster.

35. The computer-readable storage medium of claim 34 wherein the method further comprises:
generating new second federated task information pertaining to the executing instance of the second federated task;
storing the new second federated task information in the local replicated tracker data; and
transmitting the new second federated task information as new second federated task update information to the other ones of the plurality of VDM servers of the federated VDM server cluster, such that the other plurality of VDM servers of the federated VDM server cluster can store the new second federated task information in their respective local replicated tracker data.

36. The computer-readable storage medium of claim 25 wherein the storage medium is computer memory in a computer system.

* * * * *